United States Patent [19]

Interthal et al.

[11] Patent Number: 4,593,762

[45] Date of Patent: Jun. 10, 1986

[54] HIGH POLYMER SOLUTIONS HAVING AN INCREASED DRAG AND PROCESS FOR THEIR MANUFACTURE

[75] Inventors: Werner Interthal, Rüsselsheim; Franz-Josef Durst, Pfinztal-Berghausen; Raimund Haas, Achern, all of Fed. Rep. of Germany

[73] Assignee: Hoechst Aktiengesellschaft, Fed. Rep. of Germany

[21] Appl. No.: 549,216

[22] Filed: Nov. 4, 1983

Related U.S. Application Data

[63] Continuation of Ser. No. 306,072, Sep. 28, 1981, abandoned.

[30] Foreign Application Priority Data

Oct. 4, 1980 [DE] Fed. Rep. of Germany ........ 3037630

[51] Int. Cl.$^4$ ............................................. E21B 43/16
[52] U.S. Cl. ................................. 166/275; 523/175; 524/43; 524/389
[58] Field of Search .................... 523/175; 166/275

[56] References Cited

U.S. PATENT DOCUMENTS

| | | | |
|---|---|---|---|
| 3,268,459 | 8/1966 | Luck | 524/43 |
| 3,388,082 | 6/1968 | Rodgers et al. | 524/43 |
| 3,687,885 | 8/1972 | Abriss et al. | 524/389 |
| 3,724,545 | 4/1973 | Knight | 166/274 |
| 3,779,969 | 12/1973 | Slagel et al. | 523/175 |
| 4,025,703 | 5/1977 | Pornin et al. | 523/175 |
| 4,088,623 | 5/1978 | Pearl | 523/175 |
| 4,169,818 | 10/1979 | De Martino | 524/43 |
| 4,200,688 | 4/1980 | Garrett et al. | 524/43 |
| 4,341,684 | 7/1982 | Krantz | 523/175 |

OTHER PUBLICATIONS

Belgian Patents Report No. 3/69-S. General Organic-p. 2, #718029.
A.C.S. article by Nakajima-"Advances in Chemistry" Series 125 (1973) pp. 98–107.

*Primary Examiner*—Joseph L. Schofer
*Assistant Examiner*—N. Sarofim
*Attorney, Agent, or Firm*—Connolly and Hutz

[57] ABSTRACT

High polymer solutions having an extremely increased drag, which are characterized in that they contain additionally one or several completely soluble or miscible compounds, that have a molecular weight of less than 500,000 and increase the viscosity of the high polymer solution to a value of $10^5$ Pa.s.

12 Claims, No Drawings

HIGH POLYMER SOLUTIONS HAVING AN INCREASED DRAG AND PROCESS FOR THEIR MANUFACTURE

This application is a continuation of our copending application Ser. No. 306,072 filed 9/28/81, now abandoned.

It is known that liquids having a very low content of high polymers (ppm range) have particular flow properties. For example, upon a passage of these solutions through converging or diverging flow fields, their drag is extremely increased. Flow forms of this type can be observed inter alia when liquids flow from a relatively great reservoir into a narrow tube, into an annular gap or through an aperture. Further typical examples are flows through pores or filters, the liquid passing through a sand bedding, a filter or a porous rock bed. These flow forms are also referred to as elongation flow, as one volume element is stretched in the converging part of the flow.

When dissolving small amounts (1 to 500 ppm) of a high polymeric substance in a liquid flowing through a certain elongation flow field, there can be observed a drastic increase in the drag of the liquid amounting up to thirty times the intial one, from a very defined velocity of flow.

As high polymers having the above-described effects there have been recommended inter alia, for aqueous flows, polyoxyethylene, Guar Gum, special polysaccharides and in particular polyacrylamides, provided that they have a very high molecular weight (generally of more than 100,000). The selection of suitable high polymers inducing the drastic increase in drag in elongation flow in the required concentration range of from 1 to 500 ppm may be easily done with the aid of the pore flow apparatus and the measuring method specified in German Offenlegungsschrift DE-OS No. 2,904,848.

Elongation flow in the form of filter or pore flow can be observed frequently in the industry. Filtration, for example, represents an important step in a great number of industrial processes, whereas pore flow has gained technical importance in monitoring the leakage water in excavations, in the case of dams and in oil pollution. Pore flow in porous rock formations and sands has moreover gained great importance recently in tertiary oil production measures, these measures comprising injecting dilute polymer solutions into the petroliferous rock beds to impede a breakthrough of the floodwater and to favor to a great extent the depletion even of fines pores as a result of a more uniformly encroachment of the front water portion (cf. U.S. Pat. No. 3,724,545). The polymer solutions used for this purpose must have a high drag.

These measures known as "polymer flooding" have suffered hitherto from a great number of disadvantages. For example certain polymers are subject to mechanical or thermal degradation in the pore space. It has moreover shown that a satisfactory increase in drag in elongation flow can be reached, especially when using polyelectrolytes, such as partially saponified polyacrylamides, in desalted water or in potable water. However, as soon as the salinity of the floodwater reaches values such as are generally found in petroliferous formations, the desired effect fails and the polymer solution, even in the case of elongation flow, under conditions that are found in practice, only exhibits the unsatisfactory drag values of the pure water. To avoid the aforesaid phenomenon, processes have been proposed, by the aid of which is should be possible to wash out the salts in the reservoir with great technical expenditure by flooding with fresh water prior to the actual polymer flooding procedure. It is quite obvious that this process is not economical generally and that it is unsuitable for control of the leakage water.

A further decisive disadvantage residing in the use of dilute polymer solutions in elongation is to be seen in the fact that in increase in drag under flow conditions to be found in practice very often does not occur at all. In these cases it could be possible, certainly, to increase the velocity of flow, thus approching the range where the drag is increased as well. This, however, requires a superproportional increase in pressure, which involves great difficulties from a technical point of view or can no longer be realized.

For example under the usual flow conditions of 0.5 m/day, in an oil field, it can be easily ascertained by the apparatus described in German Offenlegungsschrift No. 2,904,848 that the input pressure of the polymer solution has to be raised by ten to fifty times even in extremely favorable cases, in order just to attain the range of the extreme increase in drag by three to 30 times. This may bring about conditions in practice that may even result in an undesired burst of rock beds. Moreover an elongation flow over relatively great distances rapidly builds up pressure ranges of several hundred bar, that are hard to be realized in practice.

Generally spoken it can be observed under the most diverse conditions of elongation flow that the extreme increase in drag does not occur in practice when adding small amounts of high polymers.

It has now been found that the required increase in drag of dilute high polymer solutions establishes itself in the desired manner under practical conditions of elongation flow, if there is added to the high polymer solution additionally a component having a thickening effect and which dissolves rapidly and completely. In the case of high polymer solutions containing such additives with thickening effect, the required pressure does not have to be raised or has to be raised only up to two times, in order to reach an optimum increase in drag.

Subject of the present invention therefore are high polymer solutions with a high polymer content of from 1 to 500 ppm and which are distinguished by a drastically increased drag, these solutions comprising additionally one or several completely soluble or miscible compounds which have a molecular weight of below 500,000 and increase the viscosity of the high polymer solution up to a value of $10^5$ Pa.s.

As compounds of this type there may be added to the high polymer solutions those which have a molecular weight of below 500,000, preferably of below 100,000 and in particular of below 60,000, and increase the viscosity of the high polymer solution up to a value of $10^5$ Pa.s, for example, water-soluble cellulose derivatives, low-molecular to medium-molecular polyglycols and polysaccharides of vegetable or animal origin as well as generally any rapidly and easily soluble uncross-linked polymers having a molecular weight below the value indicated above.

Suitable water-soluble cellulose derivatives are, for example, uncross-linked compounds such as hydroxyethyl cellulose, methyl hydroxyethyl cellulose, carboxymethyl cellulose and methyl cellulose. Suitable polysaccharides are compounds such as dextran and pululan. Suitable compounds are moreover synthetic polymers such as polyvinyl alcohol, polyvinyl pyrrolidone, polyethylene or polypropylene glycols, unsaponified or partially saponified polyacrylamides, polyacrylates, polyphosphates, polyvinyl sulfonates or polyacrylamido-2-methyl-propane sulfonic acid. It should be stressed that any other polymers may be used for the above purpose, in addition to the compounds specified above, provided that they comply with the above requirements, that is, they must have a molecular weight of below 500,000, be readily, completely and rapidly soluble in the high polymer solution or be miscible therewith and provoke an increase in viscosity of the high polymer solution.

The concentration of these additives in the high polymer solution is chosen such that the required viscosity of up to $10^5$ Pa.s, preferably of from 200 mPa.s to 1 Pa.s, in particular of from 50 to 500 mP.s and more particularly of from 5 to 200 mPa.s is reached. Generally there are required at most 20 weight %, preferably up to 5 weight %, in particular up to 1 weight %, of these additives, referred to the total solution, in order to attain this viscosity.

Suitable solutions according to the present invention are moreover solutions that contain polymers of identical chemical composition in so-called bimodal distribution, that means solutions containing for example a high polymeric polyacrylamide of a molecular weight of more than $10^5$ and as the additive likewise a polyacrylamide of a molecular weight of less than 500,000. Suitable compounds for such bimodal systems are in particular the above-mentioned polyethylene glycols, partially saponified or unsaponified polyacrylamides, polysaccharides, polyacrylates, polyphosphates, polyvinylsulfonates or polyacrylamido-2-methyl-propane sulfonic acid, each of these polymers being optionally used in its low-molecular weight form with a different polymer in its high-molecular weight from. There may be used furthermore copolymers, for example, of acrylamide and one of the compounds of the group comprising acrylamido-2-methyl-propane sulfonic acid, vinyl sulfonic acid, vinyl pyrrolidone and vinyl methyl acetamide, the polymer containing at least 40 mol % of acrylamide.

The use of one of these high polymers alone at relatively high concentration, that is a concentration distinctly beyond 500 ppm, must be excluded, as such solutions can be prepared only with great technical expenditure, tend to form gelatinous particles and are not completely homogeneous. This results in an obstruction of the elongation flow canals, in particular in the case of pore flow and prevents a controlled flow. A degradation of the high polymers in such solutions under the action of strong shearing forces, for example as has been described in German Offenlegungsschrift No. 2,733,852 with the purpose of obtaining homogeneous solutions without obstruction action, signifies a destruction of the high polymer, which is hence no longer effective in the sense of the present invention.

To increase the viscosity there may also be used non-polymeric compounds, such as sodium acrylate, magmesium acetate and nicotine as well as water-miscible liquids, for example, glycerine or ethylene glycol. These compounds must be used in a higher concentration of up to 90 weight % in order to provoke an increase in viscosity of the high polymer solutions of more than 4 mPa.s.

The additives are naturally chosen such that a precipitation in the solution does not occur.

The suitable concentration and composition for each individual case may be determined by various laboratory measuring arrangements described in literature (cf. A. Ouibrahim et al. in J. Non-Newtonian Fluid Mechanics 7 (1980), Page 315; D. F. James et al. in J. Fluid Mech. 97 (4), (1980), page 655).

By the term "high polymers" in the high polymer solutions there are to be understood polymers of a molecular weight of more than 100,000. These high polymers are contained in the solution in a quantity of from 1 to 500 ppm.

The effects reached may be measured in particularly simple and rapid manner by the pore flow apparatus described in German Offenlegungsschrift No. 2,904,848. This measuring arrangement permits an easy determination of the polymer concentration to be chosen in order to obtain an optimum increase in drag for a given input rate. For example, in the case of tertiary oil production, the increase in drag is suitably set at a value such that the oil has the same drag as the flood medium or a lower drag.

The high polymer solutions according to the present invention are suitably prepared by dissolving the high polymer in water and adding the additive either in substance or in the form of a stock solution of relatively high concentration. Suitable dissolution and feed procedures for this purpose are known from the relevant technological literature. If there are used liquid additives, for example in the case of glycerine or ethylene glycol, the high polymer may be dissolved directly in the additive in a quantity of from 1 to 500 ppm. In this case the high polymer solution may be nearly anhydrous.

The advantage of the high polymer solutions according to the invention resides in the fact that their viscosity is increased by the additive contained therein, while they remain completely homogeneous. This increase in viscosity permits a controlled adjustment of the extreme drag properties of the polymer solutions in the case of elongation flow, for example pore flow. In this case the pressure has to be raised to a relatively little extent only, in order to reach the very special drag effect. However, when using polymer solutions without an additive, the pressure has to be increased to a far greater extent in order to reach the desired increase in drag in elongation flow, this pressure preventing a utilization of the said effect of dilute high polymer solutions in practice.

As a result of the controlled adjustment of the drag behavior of the high polymer solutions according to the invention the front of the polymer solution advances uniformly under elongation flow conditions, for example in pores, which prevents, for example, in the case of tertiary oil production, the feared "fingering" or, if this phenomenon has already occurred, interrupts it. The high polymer solutions according to the present invention moreover permit a minimization of losses due to leakage.

The following examples illustrate the invention:

EXAMPLE 1

A polyacrylamide partially saponified by 30%, in a concentration of 50 ppm, that has been prepared according to German Offenlegungsschrift No. 2,807,709, Example 1, section Polymer I, was examined in the pore flow apparatus described in German Offenlegungsschrift No. 2,904,848, this apparatus being charged with marbles of a medium ball diameter of 392 μm in the form of a dumped tower packing. Upon dissolution in desalted water this high polymer solution, at a medium flow rate of 0.6 m/h, exhibits a 3.5-fold increase in drag, as compared to pure water, this value being indicated by the letter m and calculated by the following equation:

$$m = \frac{\text{drag of the high polymer solution}}{\text{drag of the solvent}}$$

Upon dissolution of 0.1 weight % of calcium chloride in this high polymer solution, a second measure under the above conditions shows no more increase in drag and the flow behavior of the solution is similar to that of the pure water.

When dissolving additionally, in this salt-containing high polymer solution, 0.6 weight % of methyl hydroxyethyl cellulose so that the solution gets a viscosity of 17 mPa.s, there is reached a 10-fold increase in drag under the same flow conditions as above, while the pressure has to be increased by only 20%. The methyl hydroxyethyl cellulose used has a viscosity of 4,000 mPa.s, measured in a 2% aqueous solution in a Höppler-falling ball-viscosimeter.

EXAMPLE 2

The test is carried out in analogous manner to Example 1, using, however, instead of calcium chloride, 6% of sodium chloride. The following values of the increase in drag, as compared to pure water, have been measured:

|  | m |
| --- | --- |
| 50 ppm of polymer I in desalted water | 3.5 |
| 50 ppm of polymer I + 6% of NaCl in desalted water | 0 |
| 50 ppm of polymer I + 6% of NaCl + 0.6% of tylose H 9,000 in desalted water | 10 |

EXAMPLE 3

This test is carried out using a pore flow apparatus, that has been charged with a broadly distributed sand tower packing, instead of a marble packing, of a medium particle diameter of likewise 392 μm. The results obtained are equal to those obtained in Example 2.

EXAMPLE 4

A polyethylene oxide of a molecular weight of $4 \cdot 10^6$ that has been dissolved in water in a concentration of 50 ppm with the addition of 2% of calcium chloride, was examined in the pore flow apparatus described in German Offenlegungsschrift No. 2,904,848, this apparatus being charged with marbles of a medium particle diameter of 392 μm in the form of a dumped tower packing. The beginning of the extreme 10-fold increase in drag was observed at a medium velocity of $1.4 \cdot 10^{-2}$ m/s. No effect was observed at a velocity of $10^{-3}$ m/s. The pressure has to be raised by fourteen times, in order to increase the velocity from $10^{-3}$ m/s to 1.4 m/s, in which latter range the increase in drag takes place.

When preparing a mixture of 35% of water and 45% of glycerine having a content of calcium chloride of 2% and of the polymer I of 50 ppm and when subjecting this mixture to the above measurement, the drastic 10-fold increase in drag can be found already at a velocity of $10^{-3}$ m/s, while increasing the input pressure by only 30%.

The same results are obtained when using, instead of glycerine, the following products: 0.6% of dextrane, 1% of polyvinyl alcohol (molecular weight 80,000), 0.3% of polyvinyl pyrrolidone (molecular weight 110,000), 0.1% of polyacrylamido-2-methyl-propane sulfonic acid (molecular weight 150,000).

EXAMPLE 5

This Example demonstrates the action of the compounds according to the invention when used in oil production in an oil reservoir having a porosity of 0.4 μm and a medium pore diameter of 5 μm where the oil is produced at a flow rate of 0.5 m/day. When adding, for example the polymer I, in a concentration of 100 ppm to the flood water containing a small amount of salt, an extreme increase in drag cannot be measured. This would occur only at a velocity of 5 m/day. To reach this velocity, the input pressure would have to be increased by 10 times, as a result of which the rock would burst and the reservoir would be damaged. When adding to the floodwater prior to the addition of the high polymer, a hydroxyethyl cellulose having a viscosity of 10,000, in a concentration of 0.3 weight %, the 10-fold increase in drag occurs at a flow rate in the rock of as little as 0.5 m/day, while the pressure has to be increased by 20% only.

EXAMPLE 6

An aqueous solution of a polyoxyethylene having a molecular weight of $4 \cdot 10^6$ and being present in a concentration of 50 ppm flows through an aperture at a contraction ratio of 0.234. A 5-fold increase in drag occurs at a flow rate of $7 \cdot 10^{-3}$ m/s. To reach the same effect at a flow rate of $7 \cdot 10^{-4}$ m/s, there was used a solution of 85% of water and of 15% of polyethylene glycol having a molecular weight of 15,000 and containing 50 ppm of the aforesaid high polymer. The desired effect was attained when raising the pressure by 30% only.

What is claimed is:

1. A method for increasing drag in a flowing liquid under conditions of elongation flow, which essentially consists of:
causing the drag to be increased by means of the combination of a soluble high polymer and one or more completely soluble or miscible compounds which have a molecular weight of less than 500,000, said combination increasing the viscosity of the liquid to a value of up to about 1 Pa.s.

2. Method according to claim 1, wherein the said completely soluble or miscible compound or compounds have a molecular weight of less than 100,000.

3. Method according to claim 1, wherein said completely soluble or miscible compound or compounds increase the viscosity of the liquid to at least 200 mPa.s.

4. Method according to claim 1, wherein said completely soluble or miscible compound or compounds increase the viscosity of the liquid to 50–500 mPa.s 5. Method according to claim 1, wherein said completely soluble or miscible compound or compounds increase the viscosity of the liquid to 5–200 mPa.s.

6. A method according to claim 1, wherein said completely soluble or miscible compound or compounds increase the viscosity of the liquid to a value of from 5 mPa.s to 1 mPa.s 7. A method according to claim 1 consisting essentially of the step of injecting said liquid into petroliferous rock beds under conditions of tertiary oil production.

8. A method according to claim 1 wherein the combination of the high polymer and the completely soluble or miscible compound or compounds is in aqueous solution.

9. A method according to claim 1 wherein the liquid is flood water used in oil production in an oil reservoir.

10. A method according to claim 1, wherein the soluble high polymer is a polyacrylamide which is unsaponified or partially saponified, a polyethylene glycol, a polysaccharide, a polyacrylate, a polyphosphate, a polyvinylsulfonate, or a polyacrylamido-2-methyl-propane sulfonic acid, or mixtures thereof or copolymers thereof, with each other or with vinyl sulfonic acid, vinyl pyrrolidone, or vinyl methyl acetamide.

11. A method according to claim 10, wherein the soluble or miscible compound with a molecular weight less than 500,000 is a water-soluble cellulose derivative, a polysaccharide, polyvinyl alcohol, polyvinyl pyrrolidone, polyethylene or polypropylene glycol, a partially saponified or unsaponified polyacrylamide, a polyacrylate, a polyphosphate, a polyvinylsulfonate, or a polyacrylamido-2-methyl-propane sulfonic acid, or a mixture thereof.

12. A method according to claim 1, wherein the soluble or miscible compound with a molecular weight less than 500,000 is a water-soluble cellulose derivative, a polysaccharide, polyvinyl alchol, polyvinyl pyrrolidone, polyethylene or polypropylene glycol, a partially saponified or unsaponified polyacrylamide, a polyacrylate, a polyphosphate, a polyvinyl sulfonate, or a polyacrylamido-2-methyl-propane sulfonic acid, or a mixture thereof.

* * * * *